United States Patent
Annen

(10) Patent No.: US 10,656,615 B2
(45) Date of Patent: May 19, 2020

(54) PLC, NETWORK UNIT, CPU, AND DATA TRANSFER METHOD

(71) Applicant: Mitsubishi Electric Corporation, Tokyo (JP)

(72) Inventor: Katsuhiro Annen, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/324,647

(22) PCT Filed: Jan. 18, 2018

(86) PCT No.: PCT/JP2018/001390
§ 371 (c)(1),
(2) Date: Feb. 11, 2019

(87) PCT Pub. No.: WO2019/142288
PCT Pub. Date: Jul. 25, 2019

(65) Prior Publication Data
US 2019/0377314 A1  Dec. 12, 2019

(51) Int. Cl.
*G05B 19/05*     (2006.01)

(52) U.S. Cl.
CPC .... *G05B 19/05* (2013.01); *G05B 2219/13015* (2013.01)

(58) Field of Classification Search
CPC ..................................... G05B 19/05
USPC ......................................... 700/28
See application file for complete search history.

(56) References Cited

U.S. PATENT DOCUMENTS 5,157,775 A * 10/1992 Sanger ............... G11C 7/1075
365/230.05
2011/0307635 A1  12/2011 Onishi et al.

FOREIGN PATENT DOCUMENTS

| JP | H09-073417    | * | 3/1997 |
| JP | 2004-265001 A |   | 9/2004 |
| JP | 2007-249560 A |   | 9/2007 |
| JP | 2008-83761 A  |   | 4/2008 |

(Continued)

OTHER PUBLICATIONS

Decision to Grant received for Japanese Patent Application No. 2018-538900 dated Sep. 11, 2018, 6 pages including English translation.

(Continued)

*Primary Examiner* — Mohammad Ali
*Assistant Examiner* — Joshua T Sanders
(74) *Attorney, Agent, or Firm* — Xsensus LLP

(57) ABSTRACT

A received-data writer of a network unit records first data in a first data area when a flag is set indicating that a write is allowed, and records second data in a second data area. The first data are data for which data consistency is to be guaranteed among received data that is received from the first slave station and a second slave station, and the second data are data for which real-timeliness is to be guaranteed among the received data. A first transferrer of a CPU transfers the first data recorded in the first data area to a first storage at an interval of a first transfer period when the flag is set indicating that a read is allowed. A second transferrer of the CPU transfers the second data recorded in the second data area to a second storage at an interval of a second transfer period.

10 Claims, 11 Drawing Sheets

(56) References Cited

FOREIGN PATENT DOCUMENTS

| JP | 2016-110459 A | 6/2016 |
|---|---|---|
| WO | 2010/109584 A1 | 9/2010 |

OTHER PUBLICATIONS

International Search Report dated Apr. 3, 2018 for PCT/JP2018/001390 filed on Jan. 18, 2018, 3 pages including English Translation.

* cited by examiner

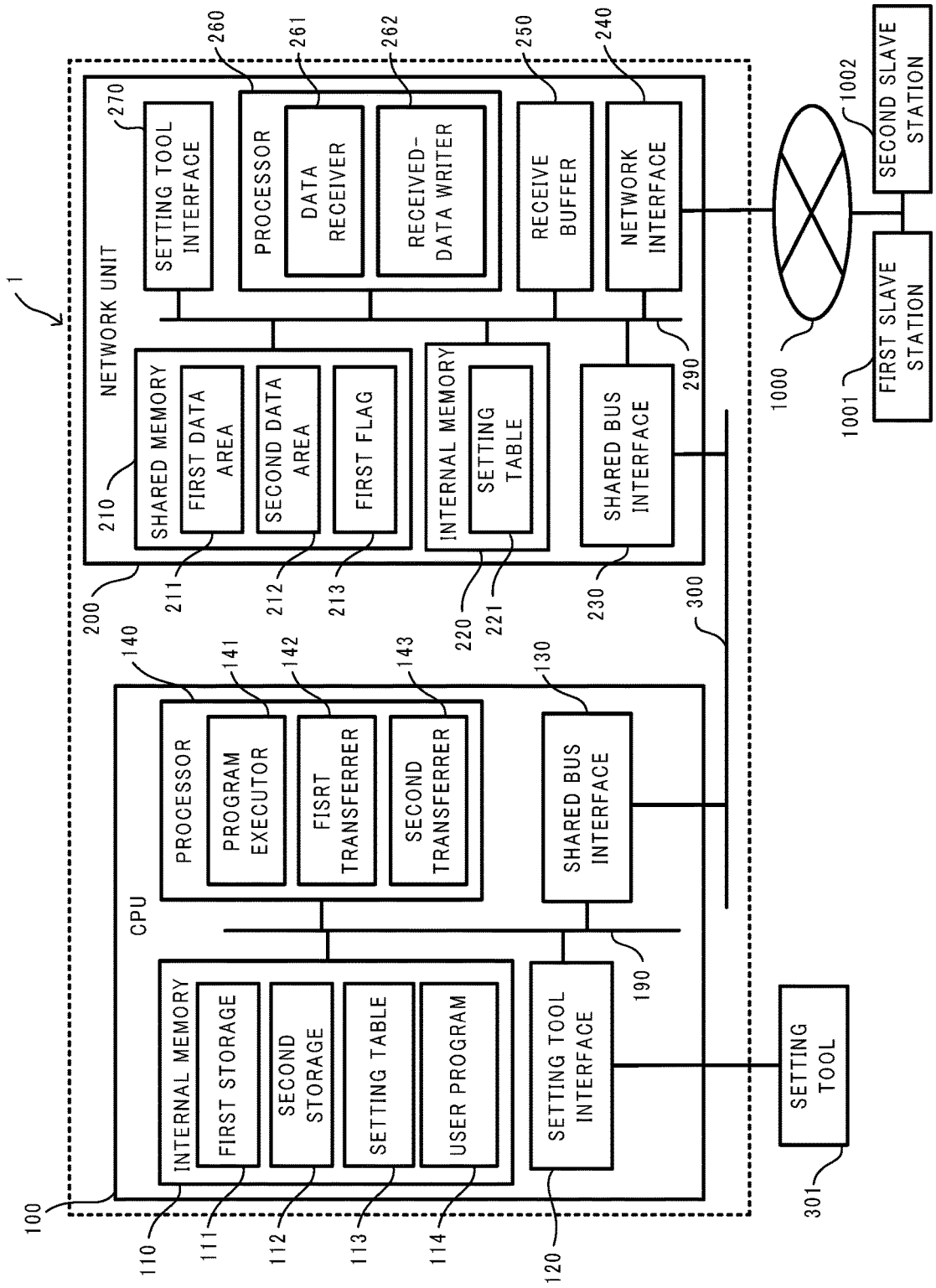

FIG.2B

| VALUE OF FIRST FLAG | STATE |
|---|---|
| 0 | STATE IN WHICH WRITE BY NETWORK UNIT TO FIRST DATA AREA IS ALLOWED |
| 1 | STATE IN WHICH READ BY CPU FROM FIRST DATA AREA IS ALLOWED |
| 2 | STATE IN WHICH READ BY CPU FROM FIRST DATA AREA IS ALLOWED |

# PLC, NETWORK UNIT, CPU, AND DATA TRANSFER METHOD

CROSS-REFERENCE TO RELATED APPLICATIONS

The present application is based on PCT filing PCT/JP2018/001390, filed Jan. 18, 2018, the entire contents of which are incorporated herein by reference.

TECHNICAL FIELD

The present disclosure relates to a PLC, a network unit, a CPU, and a data transfer method.

BACKGROUND ART

In a programmable logic controller (PLC) for use in a factory automation (FA) control system, a central processing unit (CPU) that controls the overall PLC exchanges data with a network unit using shared memory. The network unit is one of functional units and receives data from another device via a network.

When the CPU reads data from the shared memory while the network unit updates data in the shared memory, the data read by the CPU is a mix of data received by the network unit and written to the shared memory at the previous cycle time and data received by the network unit at the current cycle time. The data received by the network unit may need a certain chunk of data to be meaningful data, and thus in the above case, a single read of data that is to be read out at one time, that is, data consistency, cannot be guaranteed.

To address this disadvantage, Patent Literature 1 discloses using a flag to provide exclusive control that does not allow the CPU and the functional unit to concurrently read and write data from and to the shared memory.

For example, a known type of exclusive control uses a flag as follows. Access to the shared memory is expressed in three states: "0", indicating that a write by the network unit is allowed; "1", indicating that a read by the CPU is allowed; and "2", indicating that the CPU is in a read operation. The value of the flag that indicates these three states are changed from "0" to "1, from "1" to "2", or from "2" to "0". The CPU and the network unit access the shared memory if the value of the flag indicates that the access to the shared memory is allowed.

CITATION LIST

Patent Literature

Patent Literature 1: Unexamined Japanese Patent Application Kokai Publication No. 2004-265001

SUMMARY OF INVENTION

Technical Problem

With such a three-valued flag, the "0" state in which the write by the network unit is allowed follows the "2" state in which the CPU is in the read operation. That is, the network unit cannot enter the operation of write to the shared memory unless the CPU completes the read of data from the shared memory.

Here, the cycle time of the CPU may often differ from the cycle time of the network unit. When the cycle time of the CPU is longer than the cycle time of the network unit, a read interval of reading by the CPU from the shared memory is longer than a write interval of writing by the network unit to the shared memory. To write to the shared memory, the network unit needs to wait until the CPU completes the read operation, which may cause occurrence of a timing at which the network unit is not allowed to write to the shared memory.

In addition, a receive buffer of the network unit has a limited capacity, and thus cases may occur in which only the data last received from a given slave station can be held. In such a case, if the network unit receives data from a slave station during a period in which the network unit is not allowed to write to the shared memory, the previously received data in the receive buffer is overwritten with newly received data.

This prevents the network unit from writing the overwritten data to the shared memory, and thus the CPU cannot obtain the overwritten data. Consequently, some data are missing from the data that the CPU can otherwise obtain from the network unit.

A possible approach to avoiding such a situation is to configure the network unit to save the data of the receive buffer in another storage area before overwriting of the data in the receive buffer occurs. However, this may complicate the configuration of the network unit.

To address the above circumstances, an objective of the present disclosure is to reduce, in a simple manner, loss of data that the CPU can obtain from the network unit, while maintaining data consistency.

Solution to Problem

To achieve the foregoing objective, a PLC according to the present disclosure includes a CPU, a network unit, and a shared memory readable and writable by the CPU and the network unit. The shared memory includes a first data area and a second data area. A received-data writer of the network unit records first data in the first data area when a flag is set indicating that a write to the first data area is allowed, and records a second data in the second data area. The first data is data for which data consistency is to be guaranteed among received data that is received from a device connected via a network, and the second data is data for which real-timeliness is to be guaranteed among the received data. When the flag is set indicating that a read from the first data area is allowed, a first transferrer of the CPU reads the first data from the first data area and transfers the first data to a storage of the CPU at an interval of a first transfer period. A second transferrer of the CPU reads the second data from the second data area and transfers the second data to a storage at an interval of a second transfer period that is different from the first transfer period.

Advantageous Effects of Invention

In the PLC according to the present disclosure, the network unit records in the first data area the first data for which data consistency is to be guaranteed among the received data, when the flag is set indicating that the write to the first data area is allowed, and records in the second data area the second data for which real-timeliness is to be guaranteed among the received data. The CPU transfers the second data from the second data area to the storage at the interval of the second transfer period that is different from the first transfer period of the first data.

Such configuration can provide consistency for data for which data consistency is to be guaranteed while reducing data loss for data for which real-timeliness is to be guaranteed.

BRIEF DESCRIPTION OF DRAWINGS

FIG. 1 is a block diagram illustrating a configuration of a PLC according to Embodiment 1 of the present disclosure;

FIG. 2B is a diagram illustrating values set as a first flag of Embodiment 1:

DESCRIPTION OF EMBODIMENTS

Embodiment 1

Figure 2A:
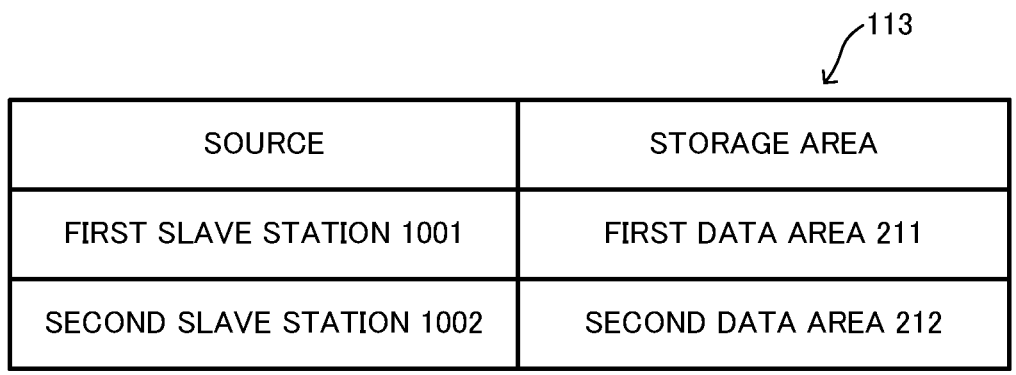
FIG. 2A is a diagram illustrating example information registered in a setting table of a CPU according to Embodiment 1.

A PLC 1 according to Embodiment 1 of the present disclosure is described below.

As illustrated in FIG. 1, the PLC 1, which serves as a master station, manages the first slave station 1001 and the second slave station 1002 that are connected via a network 1000 to the PLC 1. The PLC 1 includes a CPU 100 that controls the overall PLC 1, and a network unit 200 that communicates with the first slave station 1001 and the second slave station 1002.

Although not illustrated in FIG. 1, the CPU 100 and the network unit 200 are mounted on a base unit together with a power supply unit, and operate by supplying of power from the power supply unit. The CPU 100 and the network unit 200 are connected to each other via a shared bus 300 to establish mutual communication therebetween.

Examples of the first slave station 1001 include (i) control devices for input/output devices such as a switch, a sensor, and an indicator light, actuators, and drivers, and (ii) information communication devices such as a personal computer. The same applies to the second slave station 1002. The first slave station 1001 is one example of a first device of the present disclosure. The second slave station 1002 is one example of a second device of the present disclosure.

The CPU 100 performs an operation using input data obtained from the first slave station 1001 and the second slave station 1002, and manages, based on the result of the operation, the first slave station 1001 and the second slave station 1002. Although the slave station is described below using the first slave station 1001 as an example, the same also applies to the second slave station 1002.

The input data that the CPU 100 uses for the operation are, for example, information indicating that a switch connected to the first slave station 1001 is turned on, or information indicating that the switch is turned off. First, the first slave station 1001 sends input data to the network unit 200. The network unit 200 receives the input data from the first slave station 1001 and provides the received input data to the CPU 100 via a shared memory 210 described later.

The CPU 100 performs the operation using the input data obtained, and, based on the result of the operation, outputs control data for controlling the first slave station 1001. The control data output by the CPU 100 is, for example, information for commanding driving of an actuator connected to the first slave station 1001, or information for commanding stopping of the actuator. In this way, the PLC 1 manages the first slave station 1001.

In Embodiment 1, as data for which data consistency is to be guaranteed according to the present disclosure, a range of data for which data consistency is to be guaranteed is set from among data that the network unit 200 receives from the first slave station 1001 and the second slave station 1002. Specifically, the data for which data consistency is to be guaranteed is set to data received from the first slave station 1001. Access to the shared memory 210 for the data received from the first slave station 1001 is performed under exclusive control to guarantee the data consistency. The data received from the first slave station 1001 may be hereinafter referred to as first-range data.

As data for which real-timeliness is to be guaranteed according to the present disclosure, a range of data for which data consistency is not guaranteed is set from the data that the network unit 200 receives from the first slave station 1001 and the second slave station 1002. Specifically, the data for which real-timeliness is to be guaranteed is set to data received from the second slave station 1002. Access to the shared memory 210 for the data received from the second slave station 1002 is performed under the exclusive control. To reduce loss of data that is to be obtained, the data received from the second slave station 1002 is read from the shared memory 210 at a read timing that is different from a read timing of the first-range data. The data received from the second slave station 1002 may be hereinafter referred to as second-range data.

The CPU 100 includes an internal memory 110 that stores various kinds of data, a setting tool interface 120 for communication with a setting tool 301 described later, a shared bus interface 130 for communication via the shared bus 300, and a processor 140 that controls the overall CPU 100. Components are connected to one another via a bus 190.

The internal memory 110 includes a read only memory (ROM), a random access memory (RAM), a memory card, and the like. The internal memory 110 has a first storage 111, a second storage 112, the setting table 113, and a user program 114.

The first storage 111 and the second storage 112 are areas for storing data that is read from the shared memory 210 of the later-described network unit 200 through cyclic processing by the CPU 100.

The setting table 113 includes information indicating an area of the shared memory 210 in which the first-range data is stored, and information indicating an area of the shared memory 210 in which the second-range data is stored. The setting table 113 is used for the first transfer process and the second transfer process described later. The setting table 113 is stored in the internal memory 110 by a user's operation of the setting tool 301. The information stored in the setting table 113 is used further in the later-described received-data write process of the network unit 200. Thus the CPU 100 provides the information stored in the setting table 113 to the network unit 200 upon startup of the network unit 200.

FIG. 2A illustrates example information registered in the setting table 113. The registered information in the setting table 113 is information indicating that a storage location of the data received from the first slave station 1001, which is the first-range data, is a first data area 211, and information indicating that a storage location of the data received from the second slave station 1002, which is the second-range data, is a second data area 212.

The user program 114 includes a ladder logic program, and is a program for controlling the first slave station 1001 and the second slave station 1002 that are targets of management by the PLC 1. A command included in the user program 114 turns on or off upon input of the data received from the first slave station 1001 and the second slave station 1002, and the turn-on command is then executed. Execution of the command of the user program 114 implements calculations using input values, outputs of the calculated values, and the like. The user program 114 is created using a not-illustrated program creation support device. The program creation support device is a personal computer with a dedicated program installed therein. The user program 114 created with the program creation support device is uploaded to the CPU 100 of the PLC 1 and stored in the internal memory 110.

The setting tool interface 120 is a communication interface for the CPU 100 to communicate with the setting tool 301. The setting tool interface 120 operates under control of the processor 140.

The shared bus interface 130 is a communication interface for the CPU 100 to communicate with the network unit 200 via the shared bus 300. The shared bus interface 130 operates under control of the processor 140.

The processor 140 includes a micro-processing unit (MPU), and executes programs to perform various operations and perform control of each component of the CPU 100. The processor 140 has a program executor 141, a first transferrer 142, and a second transferrer 143.

The program executor 141 uses data stored in the first storage 111 and the second storage 112 to repeat execution of the user program 114. A period of time in which the program executor 141 executes the user program 114 can be referred to as a control period or cycle time of the CPU 100. The program executor 141 sequentially executes the turn-on commands of the user program 114 at control periods of the CPU 100. The program executor 141 stops execution of the user program 114 after execution of all the commands of the user program 114 is completed. The program executor 141 starts the execution of the user program 114 again in the next control period.

The first transferrer 142 reads, on the basis of the setting table 113, data sent by the first slave station 1001 from the shared memory 210, and transfers the data to a specified area in the internal memory 110. The specified area here is the first storage 111. Methods for specifying a transfer destination include presetting the transfer destination in the setting tool 301 and specifying the transfer destination by the user program 114. The first transferrer 142 operates at an interval of a first transfer period that is the same as the control period of the CPU 100. The first transfer period can be changed by a user with the later-described setting tool 301 as long as the first transfer period is longer than the shortest period that can be achieved with a computing capacity of the CPU 100.

The second transferrer 143 reads, on the basis of the setting table 113, data sent by the second slave station 1002 from the shared memory 210, and transfers the data to a specified area in the internal memory 110. The specified area here is the second storage 112. Methods for specifying the transfer destination include presetting the transfer destination in the setting tool 301 and specifying the transfer destination by the user program 114. The second transferrer 143 operates at an interval of a second transfer period that is shorter than the control period of the CPU 100. The second transfer period is set by a user through the later-described setting tool 301.

The network unit 200 includes the shared memory 210 that is readable and writable by both the network unit 200 and the CPU 100, the internal memory 220 that stores various types of data, the shared bus interface 230 for communication with the CPU 100 via the shared bus 300, the network interface 240 for communication with the first slave station 1001 and the second slave station 1002, a receive buffer 250 that temporarily holds data received from the first slave station 1001 and the second slave station 1002, a processor 260 that controls the overall network unit 200, and a setting tool interface 270 for communication with the later-described setting tool 301. Components are connected to one another via a bus 290.

The shared memory 210 includes a RAM, and has a first data area 211, a second data area 212, and a first flag 213. The first data area 211 stores the data received from the first slave station 1001. The second data area 212 stores the data received from the second slave station 1002.

The first flag 213 is set to a value indicating whether a write to the first data area 211 is allowed and whether a read from the first data area 211 is allowed. The values to which the first flag 213 is set are as follows. As illustrated in FIG. 2B, in a state in which a write by the network unit 200 to the first data area 211 is allowed, the first flag 213 is set to "0". In a state in which a read by the CPU 100 from the first data area 211 is allowed, the first flag 213 is set to "1". In a state in which the CPU 100 is in a read operation from the first data area 211, the first flag 213 is set to "2". The CPU 100 or the network unit 200 sets the first flag 213.

The internal memory 220 includes a ROM, a RAM, a memory card, and the like. The internal memory 220 has a setting table 221. The setting table 221 is used in the later-described received-data write process. The setting table 221 includes information indicating areas for storing data received from the first slave station 1001 and the second slave station 1002. The setting table 221 stores information provided by the CPU 100 upon startup of the network unit 200. Specifically, the information stored in the setting table 113 is provided by the CPU 100 to the network unit 200.

Figure 2C:
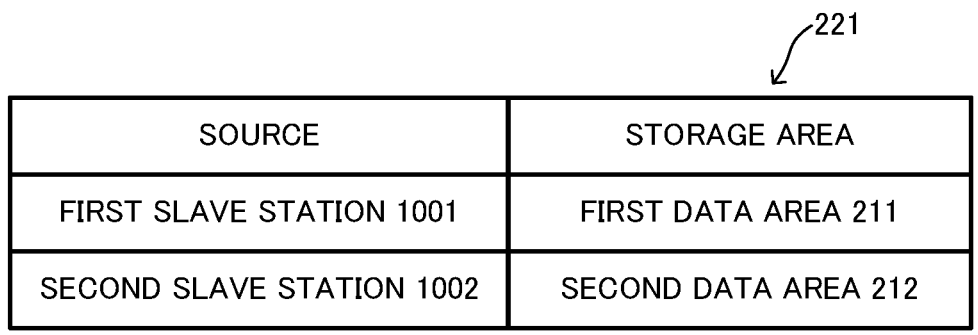
FIG. 2C is a diagram illustrating example information registered in a setting table of a network unit according to Embodiment 1.

FIG. 2C illustrates example information registered in the setting table 221. The registered information in the setting table 221 is information indicating that a storage location of the data sent by the first slave station 1001 is the first data area 211 of the shared memory 210 of the network unit 200. Another registered information in the setting table 221 is information indicating that a storage location of the data sent by the second slave station 1002 is the second data area 212 of the shared memory 210.

The network interface 240 requests, under control of the processor 260, the first slave station 1001 and the second slave station 1002 to send data at a determined timing. The network interface 240 writes to the receive buffer 250 the data received from the first slave station 1001 and the second slave station 1002.

The receive buffer 250 temporarily holds the data received by the network unit 200. The data received by the network unit 200 and the information indicating a source of the data is subsequently recorded in the receive buffer 250. The receive buffer 250 includes allocated areas for different source slave stations. Specifically, the data received by the network unit 250 from the first slave station 1001 is stored in an area of the receive buffer 250 that is allocated for the first slave station 1001. The data received by the network unit 250 from the second slave station 1002 is stored in an area of the receive buffer 250 that is allocated for the second slave station 1002. When the network unit 250 receives the data from either one of the slave stations, the data stored in the area of the receive buffer 250 that is allocated for that slave station is overwritten.

The processor 260 includes a data receiver 261 and a received-data writer 262.

The data receiver 261 causes the network interface 240 to send, at a determined timing, a control signal that requests the first slave station 1001 and the second slave station 1002 to send the data. The data receiver 261 causes the network interface 240 to store in the receive buffer 250 the data received from the first slave station 1001 and the second slave station 1002.

The received-data writer 262 records, on the basis of the setting table 221, the data held in the receive buffer 250 into the shared memory 210. In an example illustrated in FIG. 2C, the received-data writer 262 checks a first flag 213, and if the value of the first flag is 0, then the received-data writer 262 records in the first data area 211 the data received from the first slave station 1001. At this time, the data already recorded in the first data area 211 is overwritten. The received-data writer 262 records in the second data area 212 the data received from the second slave station 1002, regardless of the value of the first flag 213. At this time, the data already recorded in the second data area 212 is overwritten. The received-data writer 262 operates at control periods of the network unit 200.

The setting tool 301 includes a personal computer with a dedicated application program installed therein. A user connects the setting tool 301 to the CPU 100 via a communication cable, and operates the setting tool 301 to store the setting table 113 illustrated in FIG. 2A in the internal memory 110 of the CPU 100.

This embodiment assumes that the data sent by the first slave station 1001 needs a certain chunk of data to be meaningful data and thus is data for which data consistency is desirably guaranteed Examples of data for which data consistency is desirably guaranteed include data having a large size and numerical data with a large number of digits. It is assumed that the data sent by the second slave station 1002 does not require a guarantee of data consistency. Examples of data sent by the second slave station 1002 to the network unit 200 include data, such as temperatures and atmospheric pressures, which are desirably used by logging and acquired in real time, or data for which real-timeliness is to be guaranteed.

Firstly, a received-data write process is described in which the received-data writer 262 of the network unit 200 writes to the shared memory 210 the data received from the first slave station 1001 and the second slave station 1002. The received-data writer 262 executes the received-data write process at control periods of the network unit 200.

Figure 3:
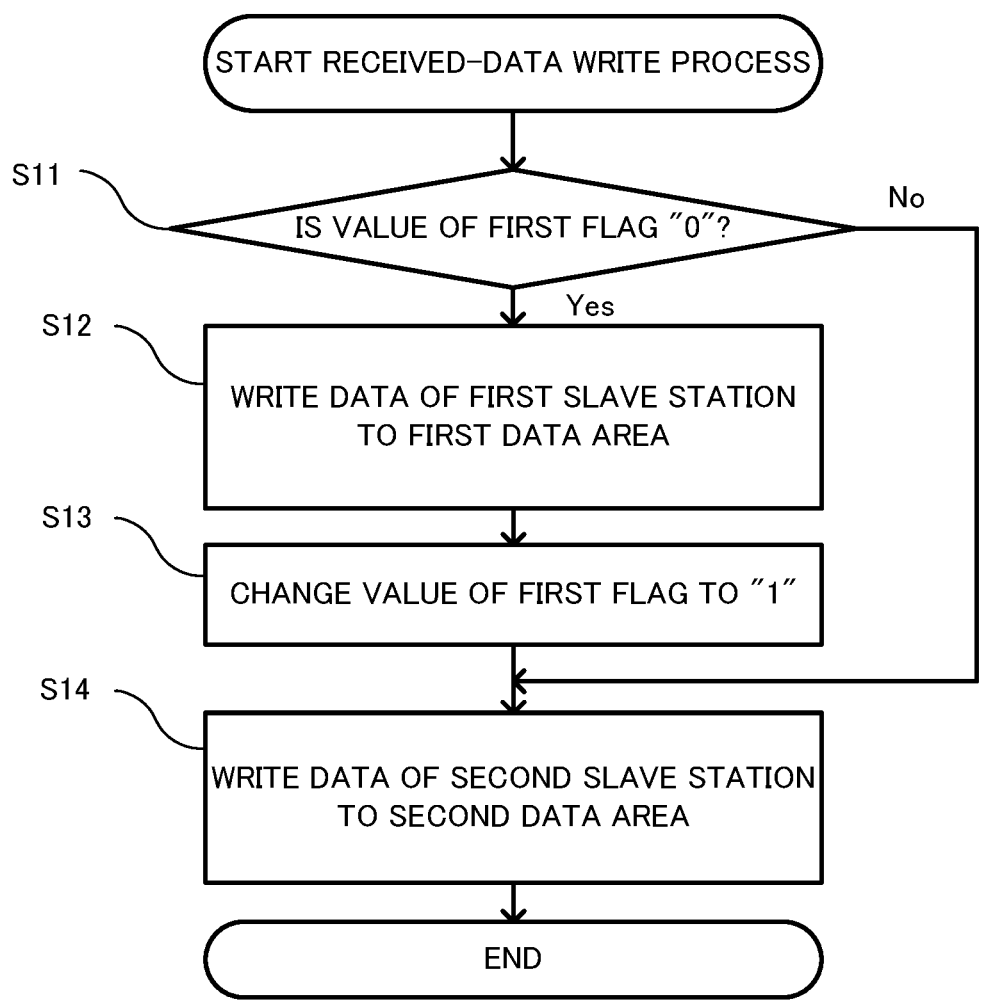
FIG. 3 is a flow chart illustrating a received-data write process of the network unit of Embodiment 1.

As illustrated in FIG. 3, the received-data writer 262 of the network unit 200 determines whether the value of the first flag 213 is "0" (step S11). Upon determination that the value of the first flag 213 is "0" (Yes in step S11), the received-data writer 262 writes to the first data area 211, among data stored in the receive buffer 250, data received from the first slave station 1001 (step S12). After the write, the received-data writer 262 changes the value of the first flag 213 to "1" (step S13), and then executes processing of step S14.

Conversely, upon determination, in step S11, that the value of the first flag 213 is not "0" (No in step S11), the received-data writer 262 executes processing of step S14.

In step S14, the received-data writer 262 writes to the second data area 212, among data stored in the receive buffer 250, data received from the second slave station 1002 (step S14).

Next, a data transfer process is described in which the CPU 100 reads data of the shared memory 210 and transfers the data to the internal memory 110.

Firstly, a first transfer process of transfer of data by the first transferrer 142 from the first data area 211 to the internal memory 110 is described. The first transferrer 142 executes the first transfer process at the control periods of the CPU 100.

Figure 4A:
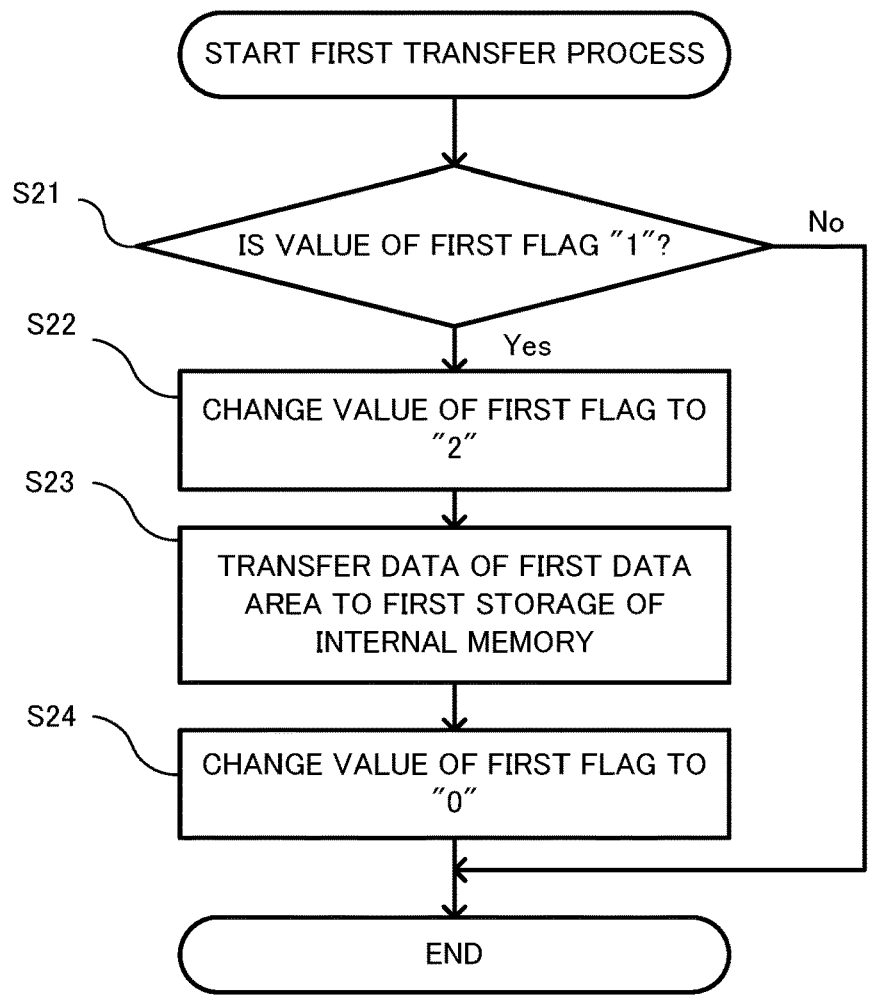
FIG. 4A is a flow chart of a first transfer process of the CPU of Embodiment 1.

As illustrated in FIG. 4A, the first transferrer 142 executes the first transfer process at the control periods of the CPU 100. The first transferrer 142 first reads the value of the first flag 213 of the network unit 200, and determines whether the value of the first flag 213 is "1" (step S21). Upon determination that the value of the first flag 213 is "1" (Yes in step S21), the first transferrer 142 changes the value of the first flag 213 to "2" (step S22). Then, the first transferrer 142 reads the data stored in the first data area 211 of the network unit 200, and transfers the data to the first storage 111 of the internal memory 110 (step S23). Specifically, the first transferrer 142 copies the data stored in the first data area 211 into the first storage 111.

The first transferrer 142 then changes the value of the first flag 213 to "0" (step S24). This step enables the network unit 200 to again write to the first data area 211 of the shared memory 210. The first transfer process of the first transferrer 142 is completed via the above steps.

Next, a second transfer process of transfer of data by the second transferrer 143 from the second data area 212 to the internal memory 110 is described. The second transferrer 143 executes the second transfer process at in interval of a period shorter than the control period of the CPU 100. A period of time in which the second transferrer 143 starts the second transfer process is hereinafter referred to as a second transfer period.

Figure 4B:
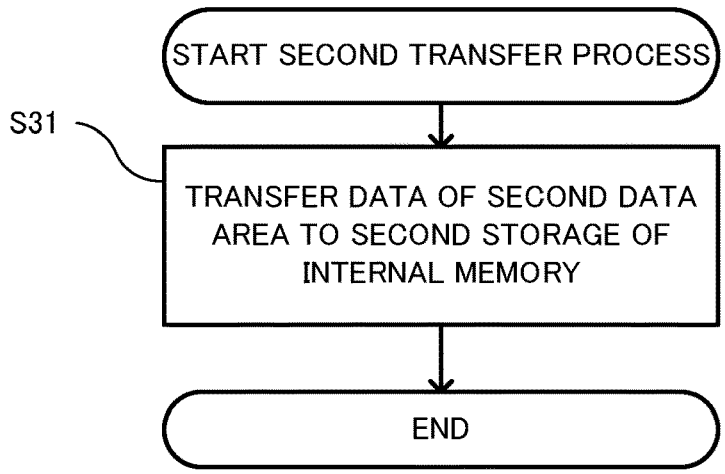
FIG. 4B is a flow chart of a second transfer process of the CPU of Embodiment 1.

As illustrated in FIG. 4B, the second transferrer 143 reads the data stored in the second data area 212, and transfers the data to the second storage 112 of the internal memory 110 (step S31). A flag is not set to the second data area 212, and thus the second transfer process is completed via the above step.

Through the above processes, the data stored in the first data area 211 of the shared memory 210 is transferred to the first storage 111 of the CPU 100, and the data stored in the second data area 212 of the shared memory 210 is transferred to the second storage 112 of the CPU 100.

Figure 5:
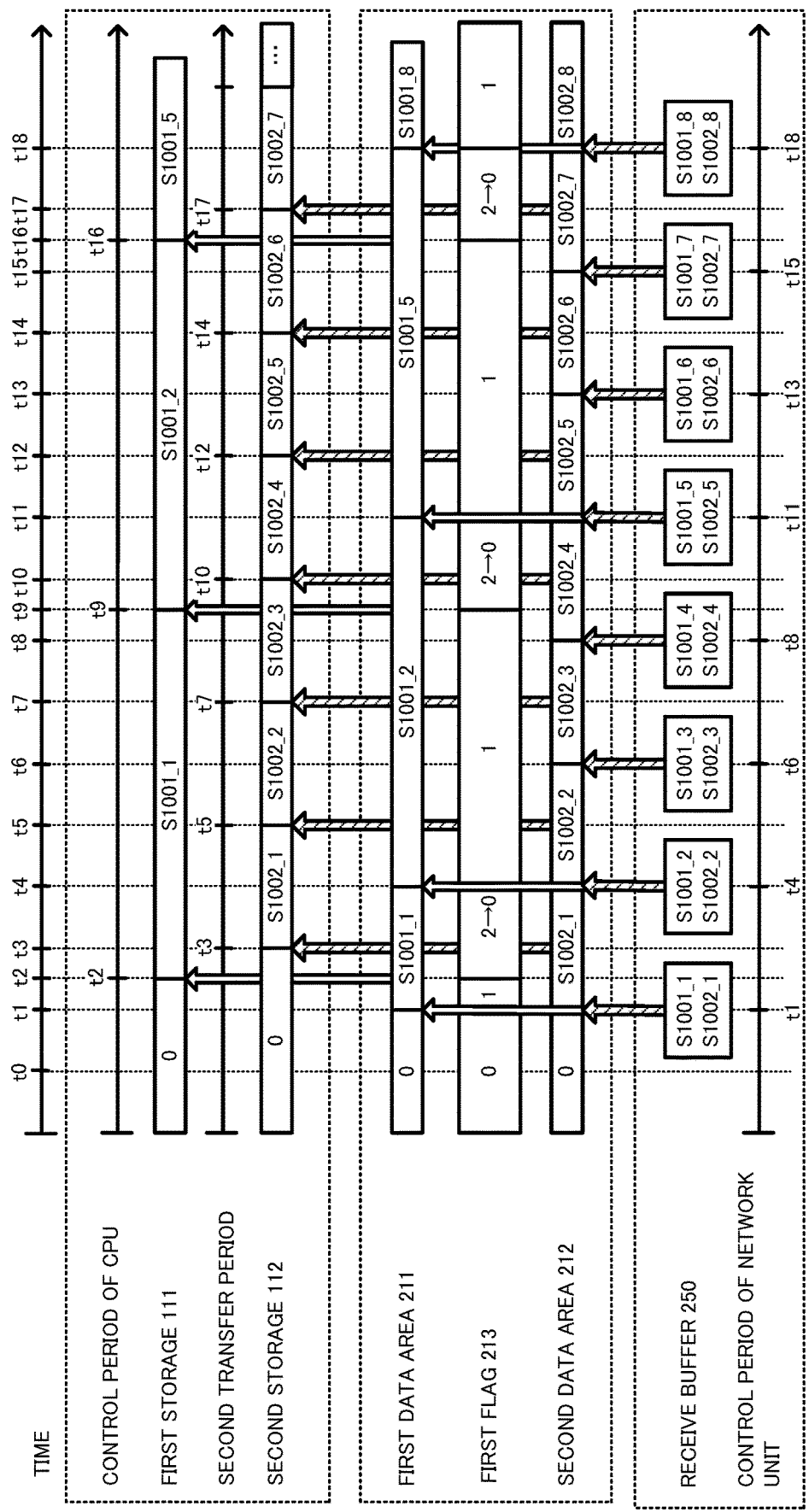
FIG. 5 is a diagram illustrating data transfer among the network unit, a shared memory, and the CPU according to Embodiment 1.

The following describes, with reference to FIG. 5, how the data received by the network unit 200 from the first slave station 1001 and the second slave station 1002 are transferred to the CPU 100 through execution of the received-data write process, the first transfer process, and the second transfer process described above.

It is assumed that at time t1 data S1001_1 received from the first slave station 1001 and data S1002_1 received from the second slave station 1002 are stored in the receive buffer 250 of the network unit 200. It is assumed that data is sent by the first slave station 1001 and the second slave station 1002 at determined timings, and in an example of FIG. 5, the data stored in the receive buffer 250 is overwritten with newly received data at each time t1, t4, t6, t8, t11, t13, t15, and t18.

The second transfer period is set to be substantially the same as the control period of the network unit 200. Cycles of the second transfer periods are out of sync with cycles of the control periods of the network unit 200.

At time t1, since the value of the first flag 213 is "0", the received-data writer 262 writes data S1001_1 in the first data area 211. The received-data writer 262 also writes the data S1002_1 to the second data area 212. Then the received-data writer 262 updates the value of the first flag 213 to "1".

At time t2, since the value of the first flag 213 is "1", the first transferrer 142 changes the value of the first flag 213 to "2", and reads data stored in the first data area 211 and transfers the data to the first storage 111. The data S101_1 is thus stored in the first storage 111. Then the first transferrer 142 changes the value of the first flag 213 to "0".

At time t3, the second transferrer 143 reads data stored in the second data area 212 and transfers the data to the second storage 112. The data S1002_1 are thus stored in the second storage 112.

At time t4, since the value of the first flag 213 is "0", the received-data writer 262 reads data S1001_2, and writes the data to the first data area 211. The received-data writer 262 also reads data S1002_2 and writes the data to the second data area 212. Then, the received-data writer 262 changes the value of the first flag 213 to "1".

At time t5, the second transferrer 143 reads data stored in the second data area 212 and transfers the data to the second storage 112. The data S1002_2 is thus stored in the second storage 112. The time t5 is not a timing at which the control period of the CPU 100 occurs, and thus the first transferrer 142 does not transfer the data stored in the first data area 211 to the first storage 111.

At time t6, since the value of the first flag 213 is "1", the received-data writer 262 does not write data S1001_3 stored in the first data area 211 to the first data area 211, and only writes data S1002_3 to the second data area 212.

At time t7, the second transferrer 143 reads data stored in the second data area 212 and transfers the data to the second storage 112. The data S1002_3 is thus stored in the second storage 112. The time t7 is not a timing at which the control period of the CPU 100 occurs, and thus the first transferrer 142 does not transfer the data stored in the first data area 211 to the first storage 111.

At time t8, since the value of the first flag 213 is "1", the received-data writer 262 does not write data S1001_4 to the first data area 211, and reads only data S1002_4 and writes the data to the second data area 212.

At time t9, since the value of the first flag 213 is "1", the first transferrer 142 changes the value of the first flag 213 to "2", and reads data stored in the first data area 211 and transfers the data to the first storage 111. The data S1001_2 is thus stored in the first storage 111. Then, the first transferrer 142 changes the value of the first flag 213 to "0".

At time t10, the second transferrer 143 reads data stored in the second data area 212 and transfers the data to the second storage 112. The data S1002_4 is thus stored in the second storage 112. The time t10 is not a timing at which the control period of the CPU 100 occurs, and thus the first transferrer 142 does not transfer the data stored in the first data area 211 to the first storage 111. Although the processing at time t11 and the subsequent time points is not described here, the received-data writer 262, the first transferrer 142, and the second transferrer 143 continue processes similarly.

As described above, when a write to the first data area 211 is allowed, the received-data writer 262 reads data received from the first slave station 1001 and writes the data to the first data area 211. When a read from the first data area 211 by the CPU 100 is allowed, the first transferrer 142 transfers, to the first storage 111 of the internal memory 110, the data read from the first data area 211. Accordingly, data consistency is guaranteed for the data received from the first slave station 1001.

The received-data writer 262 writes data received from the second slave station 1002 to the second data area 212, regardless of read and write states of the second data area 212. The second transferrer 143 reads data stored in the second data area 212 of the shared memory 210 and transfers the data to the second storage 112 at an interval of a period shorter than the control period of the CPU 100, regardless of the read and write states of the second data area 212. This does not guarantee data consistency, but enables most of data received from the second slave station 1002 by the network unit 200 to be transferred to the second data area 212.

The example illustrated in FIG. 5 achieves transfer, to the second storage 112 of the CPU 100, of the data that the network unit 200 receives from the second slave station 1002 in all the control periods. This can be achieved due to setting of the second transfer period to be substantially the same as the control period of the network unit 200.

When the second transfer period is set to be longer than the control period of the network unit 200, non-transfer of some of the data sent by the second slave station 1002 can occur. Thus, advantageously, the second transfer period is adapted to the control period of the network unit 200 by setting the second transfer period to be shorter than the control period of the CPU 100 while ensuring time for the second transferrer 143 to transfer data from the second data area 212 to the second storage 112.

By setting the second transfer period to be shorter than the control period of the CPU 100, little, if any, loss of data to be transferred is thought to occur. This can reduce missing data that is otherwise transferred to the CPU 100.

Embodiment 1 described above does not provide a guarantee of data consistency to the data supplied from the second slave station 1002, which are set as data for which real-timeliness is to be guaranteed.

Embodiment 2

In Embodiment 2, a guarantee of data consistency is also provided to the second-range data, and the configuration therefor is described below. A PLC 2 according to Embodiment 2 has the CPU 100 and the network unit 200, similarly to the PLC 1 of Embodiment 1. The description below is mainly centered on differences between Embodiments 1 and 2.

In Embodiment 2, data for which data consistency is to be guaranteed is taken to be data received from the first slave station 1001. Similarly to Embodiment 1, access to the shared memory 210 for the data received from the first slave station 1001 is performed under exclusive control to guarantee the data consistency. The data received from the first slave station 1001 may be hereinafter referred to as first-range data.

The data for which real-timeliness is to be guaranteed is set to data received from the second slave station 1002. A guarantee of data consistency and a reduced loss of data that is to be acquired are provided for the data received from the second slave station 1002. Thus access to the shared memory 210 for the data received from the second slave station 1002 is performed under exclusive control, and is read from the shared memory 210 at a read timing that is different from a read timing of the first-range data. The data received from the second slave station 1002 may be hereinafter referred to as second-range data.

Figure 6:
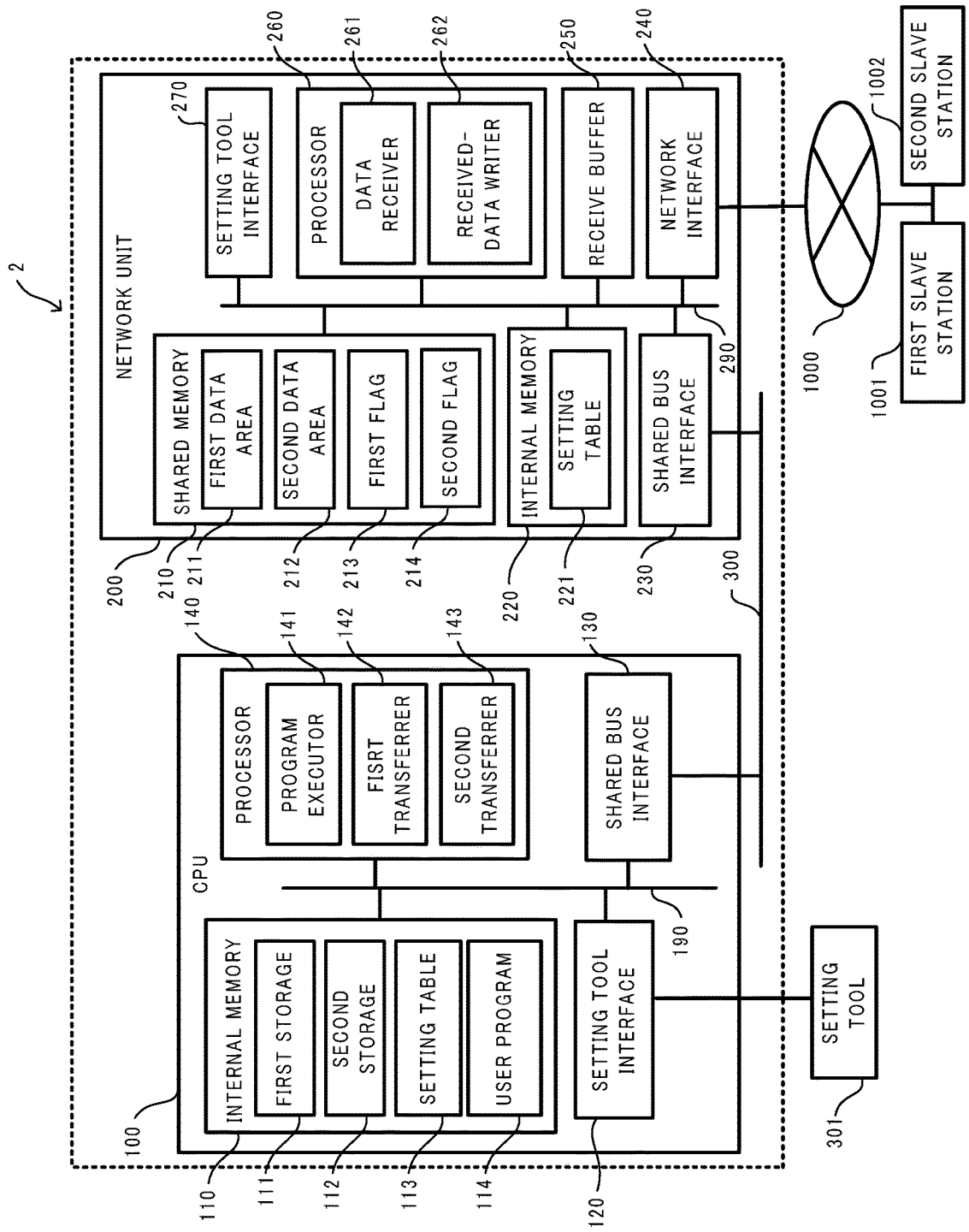
FIG. 6 is a block diagram illustrating a configuration of a PLC according to Embodiment 2 of the present disclosure.

As illustrated in FIG. 6, the shared memory 210 of the network unit 200 of the PLC 2 further includes a second flag 214. The second flag 214 is a flag for exclusive control of access to the second data area 212. The values to which the second flag 214 is set are similar to the values to which the first flag 213 is set. As illustrated in FIG. 2B, in a state in which a write by the network unit 200 to the second data area 212 is allowed, the second flag 214 is set to "0". In a state in which a read by the CPU 100 from the second data area 212 is allowed, the second flag 214 is set to "1". In a state in which the CPU 100 is in a read operation from the second data area 212, the second flag 214 is set to "2".

Figure 7:
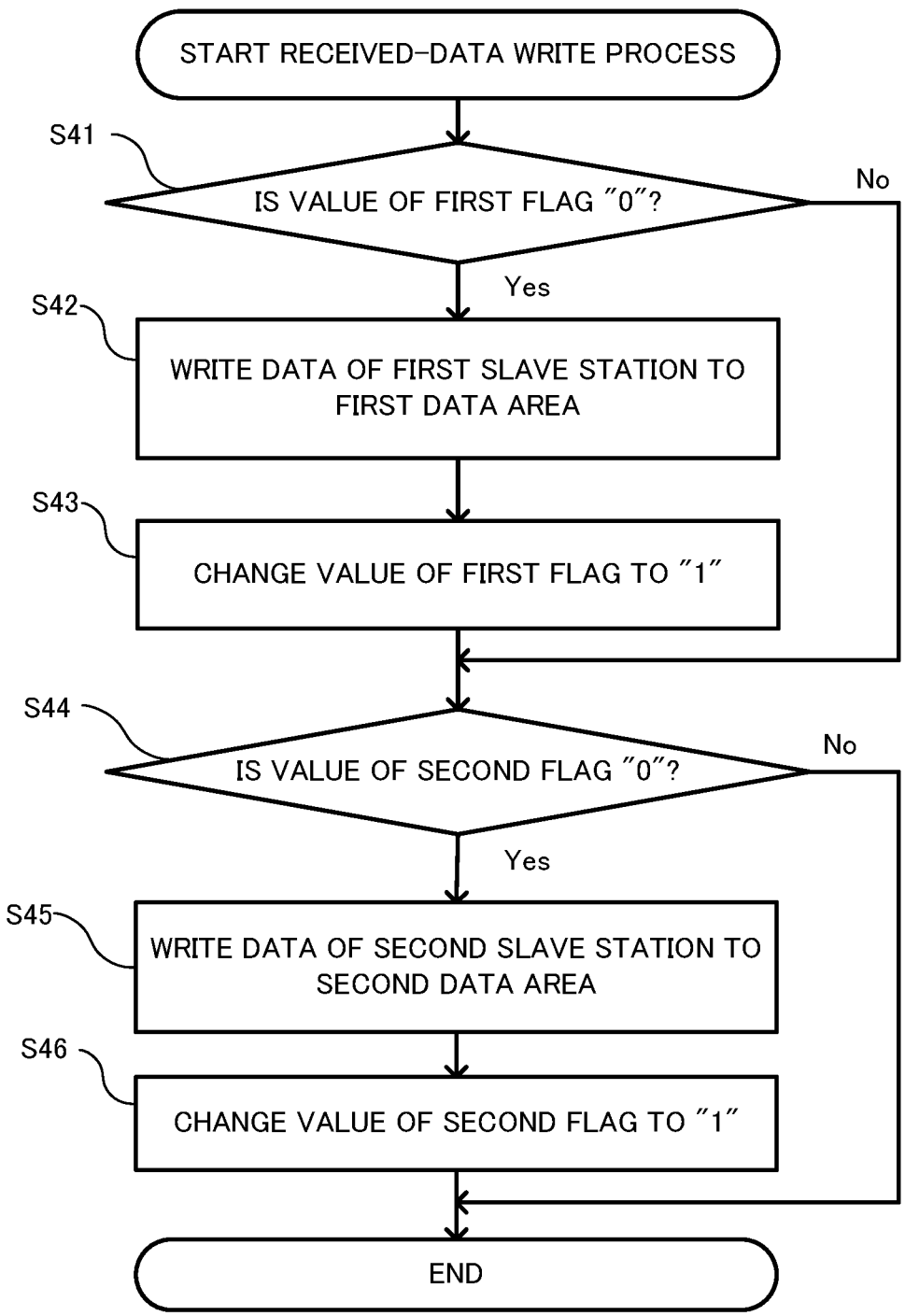
FIG. 7 is a flow chart of a received-data write process of a network unit according to Embodiment 2.

With reference to FIG. 7, a received-data write process is described in which the received-data writer 262 of the network unit 200 writes to the shared memory 210 the data received from the first slave station 1001 and the second slave station 1002. The received-data writer 262 executes the following processing at the control periods of the network unit 200.

As illustrated in FIG. 7, the received-data writer 262 of the network unit 200 determines whether the value of the first flag 213 is "0" (step S41). Upon determination that the value of the first flag 213 is "0" (Yes in step S41), the received-data writer 262 writes to the first data area 211 data received from the first slave station 1001, among data stored in the receive buffer 250 (step S42). After the write, the received-data writer 262 changes the value of the first flag 213 to "1" (step S43), and then executes processing of step S44.

Conversely, upon determination, in step S41, that the value of the first flag 213 is not "0" (No in step S41), the received-data writer 262 executes processing of step S44. In step S44, the received-data writer 262 determines whether the value of the second flag 214 is "0" (step S44).

Upon determination that the value of the second flag 214 is "0" (Yes in step S44), the received-data writer 262 writes to the second data area 212 the data received from the second slave station 1002, among data stored in the receive buffer 250 (step S45). After the write, the received-data writer 262 changes the value of the second flag 214 to "1" (step S46).

Conversely, upon determination, in step S44, that the value of the first flag 213 is not "0" (No in step S44), the received-data writer 262 ends the received-data write process without writing the data stored in the receive buffer 250 to the second data area 212.

Since the first transfer process executed by the first transferrer 142 of the CPU 100 is similar to the flow illustrated in FIG. 4A of Embodiment 1, the description thereof is omitted.

Figure 8:
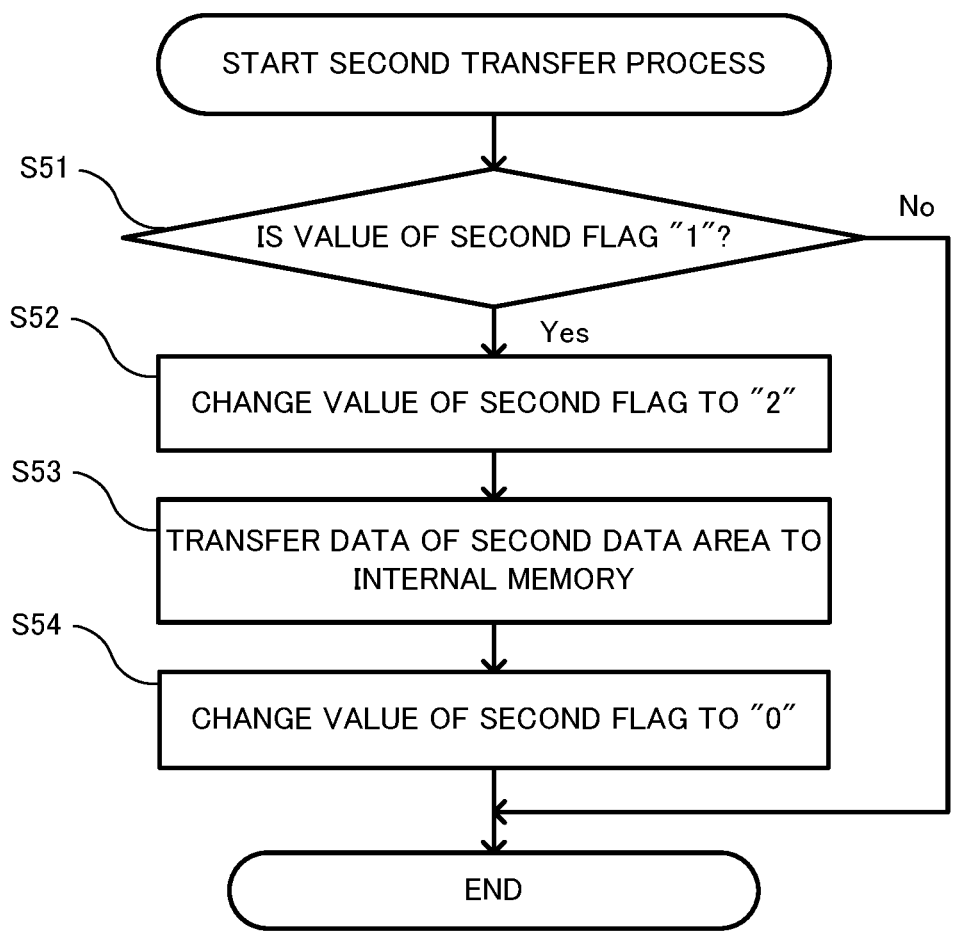
FIG. 8 is a flow chart of a second transfer process of the CPU of Embodiment 2.

A second transfer process of data in which the second transferrer 143 reads data stored in the shared memory 210 and transfers the data to the internal memory 110 is described below with reference to FIG. 8. The second transferrer 143 executes the second transfer process at the interval of the second transfer period that is shorter than the control period of the CPU 100.

Firstly, the second transferrer 143 determines whether the value of the second flag 214 is "1" (step S51). Upon determination that the value of the second flag 214 is "1" (Yes in step S51), the second transferrer 143 changes the value of the second flag 214 to "2" (step S52). Then, the second transferrer 143 reads the data stored in the second data area 212 of the network unit 200, and transfers the data to the second storage 112 of the internal memory 110 (step S53). Specifically, the second transferrer 143 copies the data stored in the second data area 212 into the second storage 112.

The second transferrer 143 then changes the value of the second flag 214 to "0" (step S54). This step enables the network unit 200 to write again to the second data area 212 of the shared memory 210.

Conversely, upon determination, in step S51, that the value of the second flag 214 is not "1" (No in step S51), the received-data writer 262 ends the second transfer process without writing the data stored in the receive buffer 250 to the second data area 212.

Figure 9:
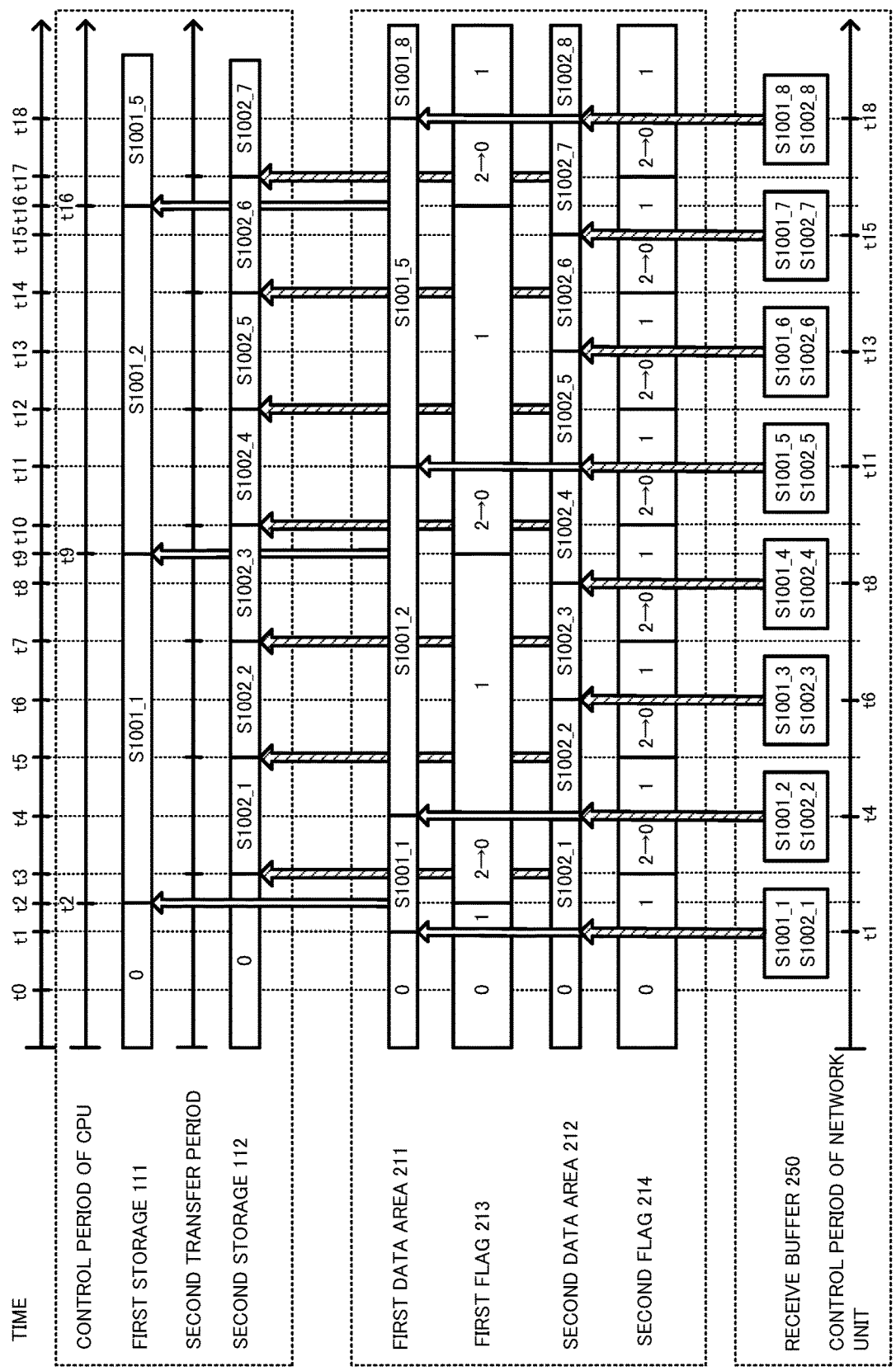
FIG. 9 is a diagram illustrating data transfer among the network unit, a shared memory, and the CPU according to Embodiment 2.

The following describes, with reference to FIG. 9, how the data received by the network unit 200 from the first slave station 1001 and the second slave station 1002 are transferred through execution of the received-data write process, the first transfer process, and the second transfer process described above.

It is assumed that at time t1, data S1001_1 and S1002_1 received from the first slave station 1001 and the second slave station 1002 are stored in the receive buffer 250 of the network unit 200. It is assumed that data is sent by the first slave station 1001 and the second slave station 1002 at determined timings, and in an example of FIG. 9, the data stored in receive buffer 250 is overwritten with newly received data at each time t1, t4, t6, t8, t11, t13, t15, and t18.

Similarly to the example of FIG. 5, the second transfer period that starts when the second transferrer 143 starts a transfer process is set to be substantially the same as the control period of the network unit 200. Cycles of the second transfer periods are out of sync with cycles of the control periods of the network unit 200.

At time t1, since the value of the first flag 213 is "0", the received-data writer 262 writes data S1001_1 to the first data area 211, and then changes the value of the first flag 213 to "1". The received-data writer 262 also writes data S1002_1 to the second data area 212 since the value of the second flag 214 is "0". Then the received-data writer 262 changes the second flag to "1".

At time t2, since the value of the first flag 213 is "1", the first transferrer 142 changes the value of the first flag 213 to "2", and reads data stored in the first data area 211 and transfers the data to the first storage 111. The data S1001_1 is thus stored in the first storage 111. Then, the first transferrer 142 changes the value of the first flag 213 to "0".

At time t3, since the value of the second flag 214 is "1", the second transferrer 143 changes the value of the second flag 214 to "2", and reads data stored in the second data area 212 and transfers the data to the second storage 112. The data S1002_1 is thus stored in the second storage 112. Then the second transferrer 143 changes the value of the second flag 214 to "0".

At time t4, since the value of the first flag 213 is "0", the received-data writer 262 writes data S1001_2 to the first data area 211, and then changes the value of the first flag 213 to "1". The received-data writer 262 also writes data S1002_2 to the second data area 212 since the value of the second flag 214 is "0". Then the received-data writer 262 changes the second flag to "1".

At time t5, since the value of the second flag 214 is "1", the second transferrer 143 changes the value of the second flag 214 to "2", and then reads data stored in the second data area 212 and transfers the data to the second storage 112. The data S1002_2 is thus stored in the second storage 112. The second transferrer 143 then changes the value of the second flag 214 to "0". The time t5 is not a timing at which the control period of the CPU 100 occurs, and thus the first transferrer 142 does not transfer the data stored in the first data area 211 to the first storage 111.

At time t6, since the value of the first flag 213 is "1", the received-data writer 262 does not write data S1001_3 to the first data area 211. The received-data writer 262 writes data S1002_3 to the second data area 212 since the value of the second flag 214 is "0". Then the received-data writer 262 changes the second flag to "1".

At time t7, since the value of the second flag 214 is "1", the second transferrer 143 changes the value of the second flag 214 to "2", and then reads data stored in the second data area 212 and transfers the data to the second storage 112. The data S1002_3 is thus stored in the second storage 112. The second transferrer 143 then changes the value of the second flag 214 to "0". The time t7 is not a timing at which the control period of the CPU 100 occurs, and thus the first transferrer 142 does not transfer the data stored in the first data area 211 to the first storage 111.

At time t8, since the value of the first flag 213 is "1", the received-data writer 262 does not write data S1001_4 to the first data area 211. The received-data writer 262 writes data S1002_4 to the second data area 212 since the value of the second flag 214 is "0". Then the received-data writer 262 changes the second flag 214 to "1".

At time t9, since the value of the first flag 213 is "1", the first transferrer 142 changes the value of the first flag 213 to "2", and then reads data stored in the first data area 211 and transfers the data to the first storage 111. The data S1001_2 is thus stored in the first storage 111. The first transferrer 142 then changes the value of the first flag 213 to "0".

At time t10, since the value of the second flag 214 is "1", the second transferrer 143 changes the value of the second flag 214 to "2", and then reads data stored in the second data area 212 and transfers the data to the second storage 112. The data S1002_4 is thus stored in the second storage 112. The second transferrer 143 then changes the value of the second flag 214 to "0".

The time t10 is not a timing at which the control period of the CPU 100 occurs, and thus the first transferrer 142 does not transfer the data stored in the first data area 211 to the first storage 111. Although the processing at time t11 and the subsequent time points is not described here, the received-data writer 262, the first transferrer 142, and the second transferrer 143 continue processes similarly.

In Embodiment 2, the first flag 213 is used for the first data area 211 and the second flag 214 is used for the second data area 212 to provide control of read and write from and to the shared memory 210. Thus data consistency is guaranteed for both the data sent by the first slave station 1001 and the data sent by the second slave station 1002.

In addition, similarly to Embodiment 1, the example illustrated in FIG. 9 achieves transfer, to the CPU 100, of the data that the network unit 200 receives from the second slave station 1002 in all the control periods. This can be achieved due to setting of the second transfer period to be substantially the same as the control period of the network unit 200.

When the second transfer period is set to be longer than the control period of the network unit 200, non-transfer of some of the data sent by the second slave station 1002 can occur. Thus, advantageously, the second transfer period is adapted to the control period of the network unit 200 by setting the second transfer period to be shorter than the control period of the CPU 100 while ensuring time for the second transferrer 143 to perform transfer from the second data area 212 to the second storage 112.

In Embodiment 2, the second flag 214 is used for the data received from the second slave station 1002 to restrict read and write from and to the second data area 212 of the shared memory 210. Thus, compared with the configuration of Embodiment 1, the configuration of Embodiment 2 is expected more often to encounter a state in which the received-data writer 262 cannot write to the second data area 212. However, Embodiment 2 also sets the transfer period of data received from the second slave station 1002 to be shorter than the transfer period of data received from the first slave station 1001, thereby enabling reduction of missing data that is otherwise received from the second slave station 1002.

Variation 1

In Embodiments 1 and 2, the data received from the first slave station 1001 is set as the first-range data for which data consistency is to be guaranteed, and the data received from the second slave station 1002 is set as the second-range data for which real-timeliness is to be guaranteed, but these ranges of data can be freely determined. For example, the first-range data may be set to data received from multiple slave stations A, B, and C, and the second-range data may be set to data received from other multiple slave stations D, E, and F.

Alternatively, slave stations that send the first-range data for which data consistency is to be guaranteed may partially overlap slave stations that send the second-range data for which real-timeliness is to be guaranteed. For example, the first-range data may be set to data received from slave stations A, B, and C, and the second-range data may be set to data received from slave stations A, D, and E. In this case, assuming that only the first-range data is put under exclusive control, combination or correction of the first-range data and the second-range data of the data received from the slave station A can guarantee data consistency and also reduce loss of data.

Alternatively, all slave stations that send the first-range data for which data consistency is to be guaranteed may overlap all slave stations that send the second-range data for which real-timeliness is to be guaranteed. Here again, combination or correction of the first-range data and the second-range data can guarantee data consistency and reduce loss of data for all of the slave stations.

Variation 2

Some of the data received from the same slave station may be set as the first-range data for which data consistency is to be guaranteed, and the other data may be set as the second-range data for which real-timeliness is to be guaranteed. For example, measurements of temperature and humidity are sent by a slave station A, and a device of the slave station A is less sensitive to temperature changes but is greatly susceptible to humidity changes. In this case, the measurements of temperature may be contained in the first-range data, and the measurements of humidity may be contained in the second-range data. The network unit 200 sorts the measurements of temperature and the measurements of humidity in accordance with header information of the received data of the slave station A, and records the measurements in the shared memory. This can reduce missing of measurements of humidity, which are the second-range data, and is effective for monitoring states of the device of the slave station A.

Variation 3

The number of ranges to be set is not limited to two. A first-range data, a second-range data, and a third-range data may be set. In this case, a third data area is additionally secured in the shared memory 210. A flag may be set to each data area of the shared memory or may be set to a part of data areas of the shared memory. A third storage is additionally secured in the internal memory 110 of the CPU 100. The same also applies to an example in which the number of ranges to be set is four or more.

Variation 4

Embodiments 1 and 2 describe an example of constant use of the second data area 212 of the shared memory 210. However, for example when a setting is made as to whether the second data area 212 of the shared memory 210 is used and the second data area 212 is set to non-use, only the first data area 211 of the shared memory 210 may be used.

In this case, it is sufficient that information indicating whether the second data area 212 of the shared memory 210 of the network unit 200 can be used is registered through the setting tool 301 in each of the setting table 113 of the CPU 100 and the setting table 221 of the network unit 200. It is sufficient that the network unit 200 is configured to write or not to write, to the second data area 212, in the received-data write process in accordance with information indicating whether the second data area 212 registered in the setting table 221 can be used or not. It is sufficient that the CPU 100 is configured to transfer or not to transfer data of the second data area 212 in the second transfer process in accordance with information indicating whether the second data area 212 registered in the setting table 113 can be used or not.

Variation 5

In Embodiments 1 and 2, each of the shared memory 210 and the internal memory 110 of the CPU 100 may not necessarily have an area for each of the first-range data and the second-range data. In the example illustrated in FIG. 1, these areas are the first data area 211, the second data area 212, the first storage 111, and the second storage 112. However, such areas may not be necessarily provided in the shared memory 210 or the internal memory 110. For example, the network unit 200 writes to the shared memory 210 the received data together with information indicating the source of the data, in accordance with header information of the received data. It is sufficient that the CPU 200 reads the received data together with the source information from the shared memory 210 and writes the read source information and the read received data to the internal memory 110.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2 PLC
100 CPU
110 Internal memory
111 first storage
112 second storage
113 Setting table
114 User program
120 Setting tool interface
130 Shared bus interface
140 Processor
141 Program executor
142 First transferrer
143 Second transferrer
190 Bus
200 Network unit
210 Shared memory
211 First data area
212 Second data area
213 First flag
214 Second flag
220 Internal memory
221 Setting table
230 Shared bus interface
240 Network interface
250 Receive buffer
260 Processor
261 Data receiver
262 Received-data writer
270 Setting tool interface
290 Bus
300 Shared bus
301 Setting tool
1000 Network
1001 First slave station
1002 Second slave station

The invention claimed is:

1. A programmable logic controller (PLC) comprising a central processing unit (CPU), network circuitry, and a shared memory readable and writable by the CPU and the network circuitry, wherein the shared memory includes a first data area and a second data area, the network circuitry includes a received-data writer to (i) record first data in the first data area when a flag is set indicating that a write to the first data area is allowed, the first data being data for which data consistency is to be guaranteed among received data that is received from a device connected via a network, and (ii) record second data in the second data area, the second data being data for which real-timeliness is to be guaranteed among the received data, and the CPU includes a storage, a first transferrer to read the first data from the first data area and transfer the first data to the storage at an interval of a first transfer period when the flag is set indicating that a read from the first data area is allowed, and a second transferrer to read the second data from the second data area and transfer the second data to the storage at an interval of a second transfer period that is different from the first transfer period.

2. The PLC according to claim 1, wherein the first transfer period is a cycle time of the CPU, and the second transfer period is shorter than the first transfer period.

3. The PLC according to claim 1, wherein
the PLC performs exclusive control over the first data area, and
the PLC does not perform exclusive control over the second data area.

4. The PLC according to claim 1, wherein the PLC performs exclusive control over the first data area and the second data area.

5. The PLC according to claim 1, wherein
the first data is data received from a first device, and
the second data is data received from a second device that is different from the first device.

6. Network circuitry configured to send and receive data via a shared memory to and from a central processing unit (CPU), the network circuitry and the CPU being included in a programmable logic controller (PLC), wherein
the shared memory includes a first data area to store first data for which data consistency is to be guaranteed and a second data area to store second data for which real-timeliness is to be guaranteed, the first data being transferrable to the CPU at an interval of a first transfer period, the second data being transferrable to the CPU at an interval of a second transfer period,
the network circuitry records the first data in the first data area when a flag is set indicating that a write to the first data area is allowed, the first data being data for which data consistency is to be guaranteed among data received from a device connected via a network, and
the network circuitry records, in the second data area, the second data for which real-timeliness is to be guaranteed among the data received from the device.

7. A central processing unit (CPU) configured to send and receive data via a shared memory to and from network circuitry, the network circuitry and the CPU being included in a programmable logic controller (PLC), the CPU comprising:
a storage;
a first transferrer to read first data from the shared memory and transfer the first data to the storage at an interval of a first transfer period when a flag is set indicating that a read from the shared memory is allowed, the first data being data for which data consistency is to be guaranteed among data stored in the shared memory; and
a second transferrer to read second data from the shared memory and transfer the second data to the storage at an interval of a second transfer period that is different from the first transfer period, the second data being data for which real-timeliness is to be guaranteed among the data stored in the shared memory.

8. The CPU according to claim 7, wherein
the first transferrer transfers the first data from the shared memory to the storage every cycle time of the CPU, and
the second transferrer transfers the second data from the shared memory to the storage at an interval of a period that is shorter than the cycle time of the CPU.

9. A data transfer method for transferring data between a central processing unit (CPU) and network circuitry via a shared memory readable and writable by the CPU and the network circuitry, the CPU and the network circuitry being included in a programmable logic controller (PLC), the data transfer method comprising:
recording, by the network circuitry, first data in the shared memory when a flag is set indicating that a write to the shared memory is allowed, the first data being data for which data consistency is to be guaranteed among received data that is received from a device connected via a network,
recording, by the network circuitry, second data in the shared memory, the second data being data for which real-timeliness is to be guaranteed among the received data,
reading, by the CPU, the first data from the shared memory and transferring, by the CPU, the first data to a storage of the CPU at an interval of a first transfer period when the flag is set indicating that a read from the shared memory is allowed, and
reading, by the CPU, the second data from the shared memory and transferring, by the CPU, the second data to the storage at an interval of a second transfer period that is different from the first transfer period.

10. The data transfer method according to claim 9, wherein
first transfer period is a cycle time of the CPU, and
the second transfer period is shorter than the first transfer period.

* * * * *